UNITED STATES PATENT OFFICE.

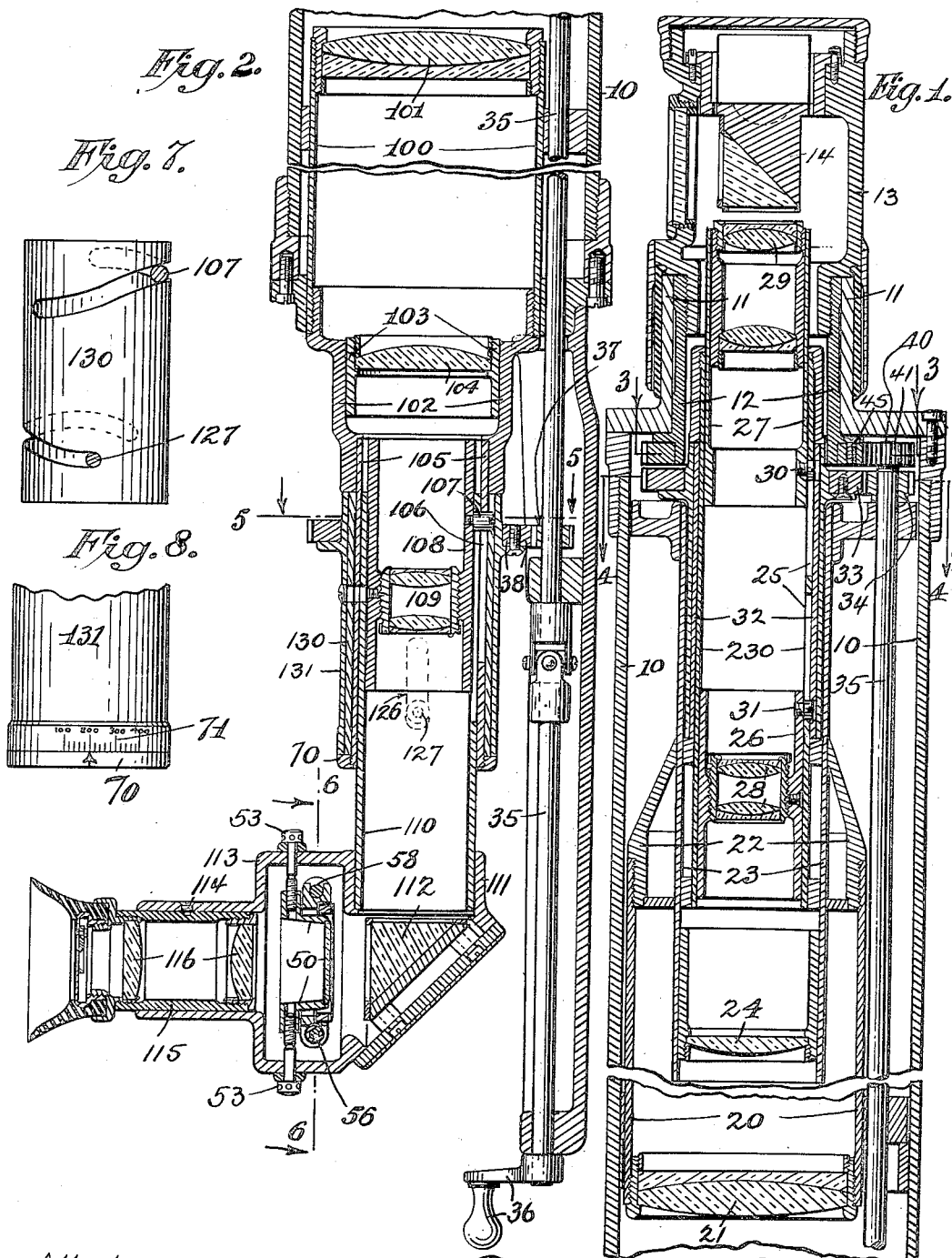

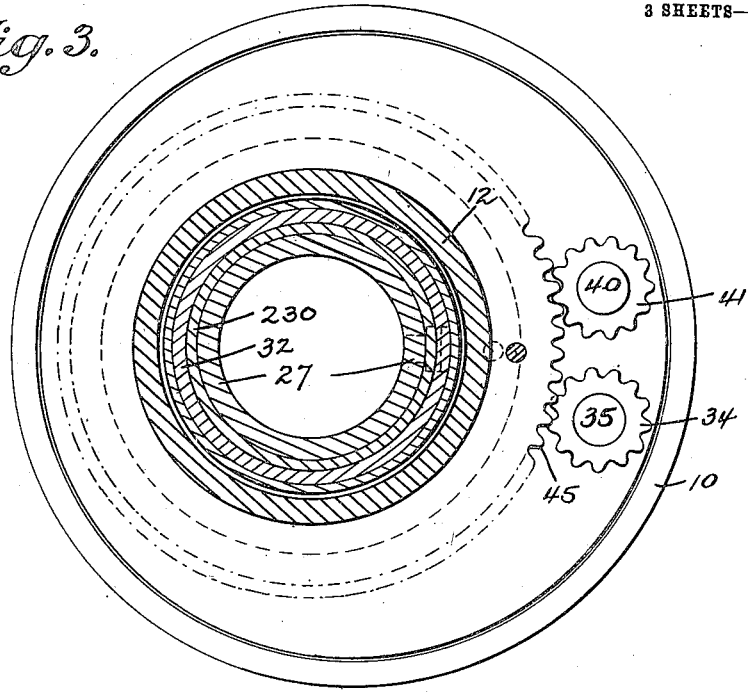
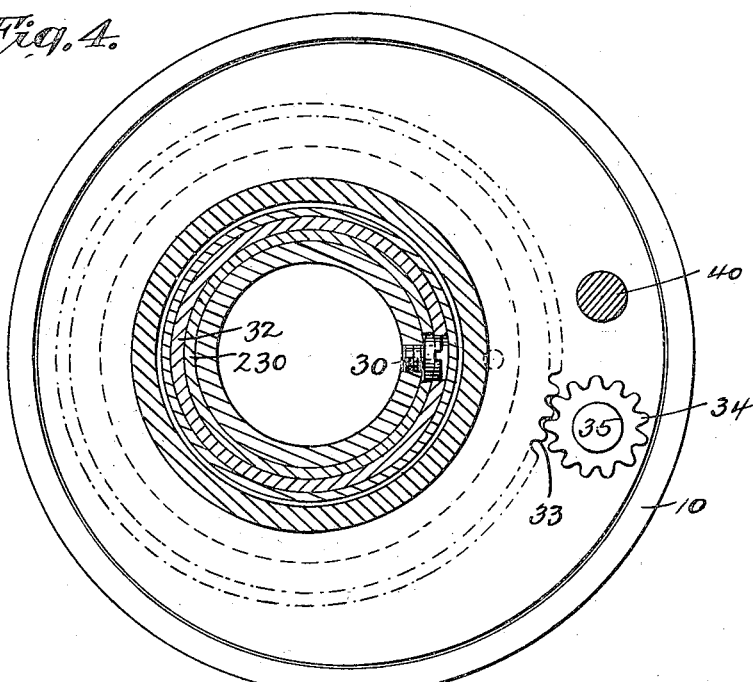

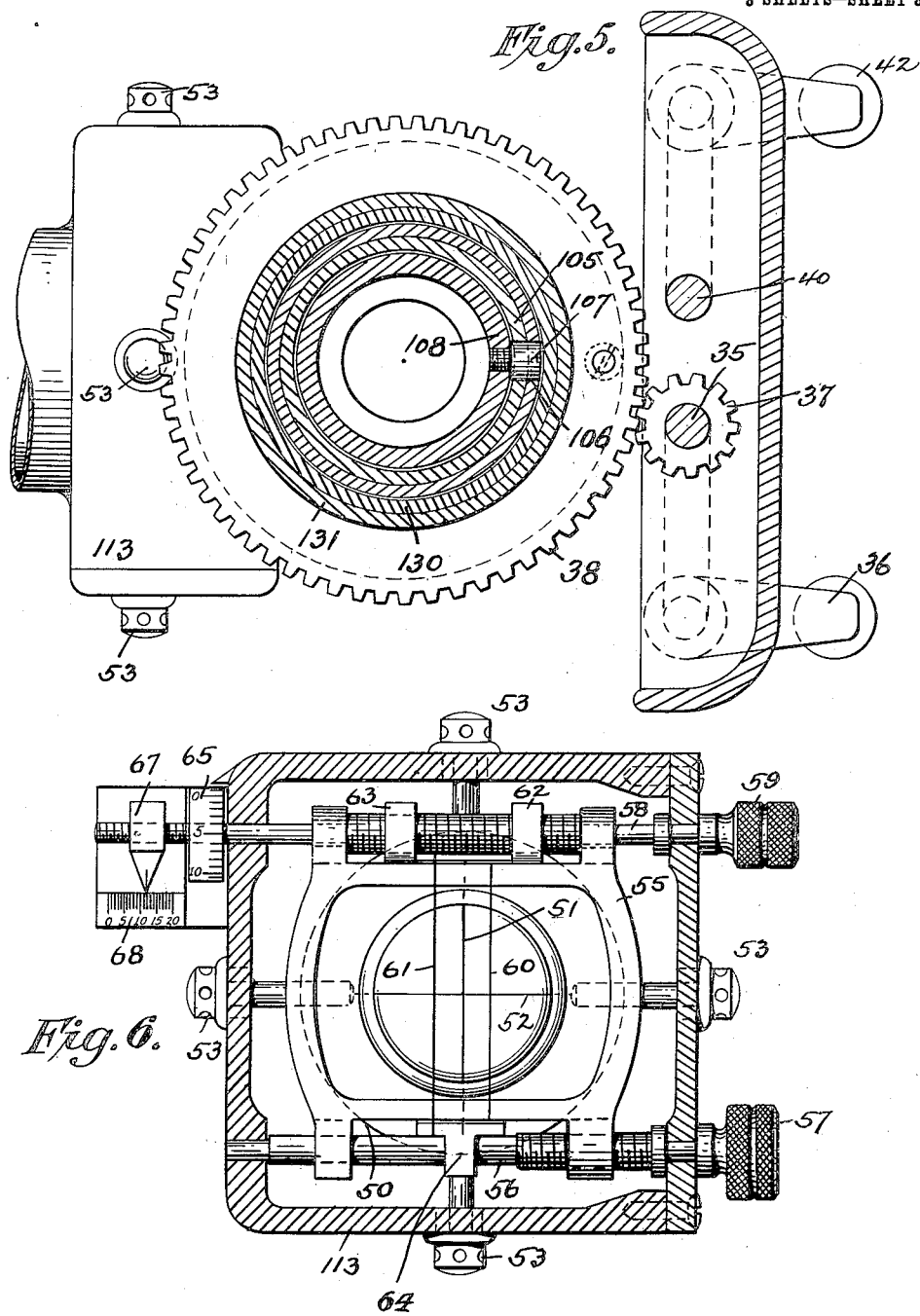

FREDERICK L. G. KOLLMORGEN, OF BOONTON, NEW JERSEY, ASSIGNOR TO KEUFFEL & ESSER COMPANY, OF HOBOKEN, NEW JERSEY, A CORPORATION OF NEW JERSEY.

OPTICAL INSTRUMENT.

1,134,388.

Specification of Letters Patent.  Patented Apr. 6, 1915.

Application filed May 6, 1913. Serial No. 765,728.

*To all whom it may concern:*

Be it known that I, FREDERICK L. G. KOLLMORGEN, a subject of the Emperor of Germany, residing at Boonton, in the county of Morris and State of New Jersey, have invented certain new and useful Improvements in Optical Instruments, of which the following is a specification.

This invention relates to optical instruments and more particularly to periscopes for submarines, and its novelty consists in the construction and adaptation of the parts as will be more fully hereinafter pointed out.

It comprises a plurality of features which are shown as jointly embodied in one instrument, but which are each capable of being independently used in other instruments and in different relations, but which it has been found convenient and useful to combine in this particular instrument for the purposes hereinafter described. One of these features relates to means for varying and controlling the magnification of the telescopes embodied in the instrument. The periscope shown and described comprises two erecting telescopes, the objectives of which face each other, the one nearest the object looked at being a reducing telescope having the function of reducing the angle at which the object is seen, and the one nearest the observer being an expanding telescope having the function of expanding the angle at which the object is seen. The upper or reducing telescope is provided with means for varying the magnification, and if desired the lower, expanding telescope is provided with similar means also for varying the magnification. The control of the means for varying the magnification in both of these telescopes is shown as a joint control from a single mechanism, but it may be independent or joint as may be most convenient for the observer.

Another novel feature of the instrument comprises a device used for determining approximately, through the means of varying the magnification of one or both telescopes, the range of a distant object such as a battleship, and it includes a micrometer provided with a scale graduated to present in units of lineal measurement the length or height of the object the distance of which is to be determined.

In the drawings, Figure 1 is a longitudinal central section through the upper part of a periscope embodying the invention and which upper part contains the reducing telescope of the device. Fig. 2 is a longitudinal central section through the lower part of the instrument and which part contains the expanding telescope of the device with the micrometer. Fig. 3 is a transverse section on the plane of the line 3—3 in Fig. 1. Fig. 4 is a transverse section on the plane of the line 4—4 in Fig. 1. Fig. 5 is a transverse section on the plane of the line 5—5 in Fig. 2. Fig. 6 is a vertical section on the plane of the line 6—6 in Fig. 2, all of these sections being on an enlarged scale. Fig. 7 is a detail of the revoluble sleeve of the lower expanding telescope showing its cam slots, and Fig. 8 is a detail of a range finding scale.

In the drawings, 10 is an external tube or casing in which the other parts are mounted and which is adapted to be suitably supported on the submarine vessel or any other place in which it is employed. At the upper extremity of the casing 10 there is rigidly secured to it a sub-casing 11 within which there is adapted to be rotated a sleeve 12 to the upper end of which is secured a prism housing 13, in which there is a suitable prism carrier 14. Mounted within the casing 10 is a shaft 40 provided at its upper extremity with a pinion 41 adapted to mesh with an annular gear 45 formed on the outside of or secured to the tube 12 by means of which the prism housing 13 is rotated by the observer, the shaft 40 at its lower end being provided with a suitable handle 42 by means of which it may be conveniently operated.

Eccentrically and securely mounted within the upper part of the casing 10 is a tube 20 which at one end carries the objective 21 of the reducing telescope. To the other end of this tube 20 there is secured a frame 22 which in turn supports a tube 23 carrying a lens 24, which is adapted to regulate the oblique rays of the telescope and is adjustable along the longitudinal axis of the instrument. Within the tube 23 is a tube 230 which is provided with two longitudinal slots 25, 25. Within the tube 230 are two tubes 26 and 27, and which carry respectively the erecting elements indicated at 28 and the eye-piece elements indicated at 29. The tube 27 is provided with a projecting stud 30 and the tube 26 with a projecting stud 31, these studs being adapted to pass through the slots 25 and to engage cam slots formed in a sleeve 32 which rotates by means of an external annular gear indicated at 33, and which is actuated by a pinion 34 rigidly secured on a long shaft 35 which at its lower end is provided with a suitable handle 36 or other means by which it may be turned. When the handle is rotated and the shaft 35 thus rotated causes the pinion 34 to move and the pinion 33 meshing with it is moved the sleeve 32 is rotated. Such rotation is translated through the studs 30 and 31 into a longitudinal movement of the tubes 26 and 27 with which they are connected, their rotation being prevented by the engagement of these same studs with the slots 25 in the tube 230. It will be understood of course that the extent and shape of these slots are designed so as to preserve the proper optical relation between the optical elements at all positions. By this construction it is obvious therefore that the rotation of the shaft 35 varies the magnification in the reducing telescope.

Eccentrically and securely mounted within the lower part of the casing 10 is a tube 100 which carries the objective 101 of the expanding telescope. To the lower end of this tube is secured a frame 102 which in turn supports a tube 103 which carries a lens 104 adapted to regulate the oblique rays of the lower telescope. A guide tube 105 carried by the frame 102 is provided with a longitudinal slot 106 adapted to be engaged by a stud 107 projecting from an inner tube 108 carrying the erecting optical elements indicated at 109. It is also provided with a longitudinal slot 126 indicated in dotted outline in Fig. 2 and which is adapted to be engaged by a stud 127, only the inner tip of which is shown in Fig. 2, and which projects outwardly from a tube 110 carrying the eye piece elements. The tube 110 is provided at its lower end with a reflecting element housing 111 (containing a reflecting element 112, in this case, a prism) which housing in turn is secured to a micrometer housing 113 having an annular sleeve 114 surrounding a tubular carrier 115 in which are arranged the eye piece optical elements 116.

A revoluble tube 130 is secured within a covering tube 131 and is provided with cam slots one of which is spiral in form and is engaged by the stud 107 of the erecting element tube 108 and the second of which is hyperbolic in form and is engaged by the stud 127 of the eye piece tube 110. The cover tube 131 is externally provided with an annular gear 37 which meshes with and is adapted to be rotated by a pinion 38 secured upon a shaft which, in the embodiment of the device illustrated, is the shaft 35. Therefore, by the rotation of this shaft the tubes carrying the erecting elements and the eye piece elements of the expanding telescope are relatively moved to vary the magnification in accordance with optical principles governing the length and shape of the slots in the tube 130 in a manner similar to that in which the magnification is varied in the reducing telescope by the rotation of the same shaft.

It is quite obvious that if the pinion 38 and the gear 37 were omitted, the rotation of the shaft 35 would vary the magnification of the reducing telescope without affecting that of the expanding telescope. It is equally obvious that the pinion 38 might as readily be mounted upon a second shaft within the casing 10 as upon the shaft 35, in which case the means for varying the magnification of the expanding telescope would be quite independent of the means for varying the magnification of the reducing telescope. Both of these modifications are regarded as within the disclosure of this specification and the principles of this invention. If only one of the telescopes is provided with means for varying the magnification, the other must in any case be also an erecting telescope but instead of having erecting and eye piece elements, it may be of Galilean or prismatic form. The two separate objectives of the two telescopes may also be replaced by one objective having a suitable focal length.

The micrometer is arranged in the housing 113 and at the focus of the eye piece or observing telescope. It comprises a frame 50 provided with the usual cross wires 51 and 52 which are adjusted by means of the usual capstan screws indicated at 53. Arranged within the housing 113 is a subframe 55 which is carried by a lower shaft 56, and is slidably supported in an upper shaft 58 by having lugs 55ª slidable thereupon. The shaft 56 is adapted to be rotated by a milled head 57 and the shaft 58 is adapted to be rotated by a milled head 59. The sub-frame 55 is adapted to be bodily moved within the housing 113 by means of the rotation of the milled head 57. This frame carries a wire 60. A second frame provided with lugs 62 and 63 internally threaded to engage a threaded sleeve 620 keyed to and slidable upon the shaft 58 between the lugs 55ª, and with a lug 64 adapted to slide on the unthreaded portion of the shaft 56, carries a wire 61. These two wires are adapted to be moved to and fro with respect to each other by the rotation of the milled head 59 which rotates the shaft 58 and sleeve 620. It is obvious that the distance apart of the wires 60 and 61 is a function of the circular movement of the shaft 58 and that the extent of such distance may be measured by the extent of the movement of the periphery of a drum 65 placed on such shaft.

The extremity of the shaft 58 outside of the housing 113 is threaded and is adapted to pass through a threaded aperture in a pointer 67, the end of which is moved with respect to a scale 68 secured to, or projecting from, the side of the housing. It is obvious that the extent of movement of the threads with respect to each other, or of the rotation of the milled head 59, can be read on such scale 68 and that fractions of a revolution may be read on the drum 65.

The variation of the magnification in the manner stated by means of the rotation of the shaft 35 provides a method of varying the magnification between unusual limits. Supposing that the magnification of the reducing telescope may be varied from one to three, and the magnification of the expanding telescope from three to one, as these magnifications are related in geometrical progression it will readily be understood that an extreme variation in magnification can, by means of the described instrument, be secured from one to nine which is an unusual capacity for an instrument of this character.

The use of the shaft 40 for rotating the prism housing at the eye piece end of the telescope is novel and enables the observer to have a fixed eye piece within the submarine vessel to which the instrument is attached and without moving from his position to rotate the head of the device so as to observe in succession more than one ship or the like, and to keep them within the range of his observation, which is very important during the maneuvers or in actual battle.

The method of using the instrument for the purpose of ascertaining the range of an object viewed through it, is as follows: Suppose that at magnification 1 a battleship of the length of 100 yards and situated at a distance of 1,000 yards subtends in the micrometer a lineal distance of ten millimeters between the threads 60 and 61. It follows then that the same battleship situated at a distance of 2,000 yards would subtend only one-half of that distance; but by varying the magnification to a power 2 the image of the battleship would again fit exactly between the wires 60 and 61, as seen through the eye piece. It thus follows that if the scale 67 and sub-scale 65 are set to graduations corresponding to the angle subtending such an image at 1,000 yards for magnification 1, then at 2,000 yards the magnification would have to be raised to 2, and at 3,000 yards to 3, for the same ship to appear exactly to touch both of the wires 60 and 61. Thus, the variation of the magnification serves to determine with considerable accuracy the distance at which the ship is located from the instrument. To the end that such range may be accurately read without any calculations or reductions, a pointer is provided on a fixed ring 70 secured outside of the tube 110 carrying the eye piece, and a scale indicated at 71 is provided on the lower edge of the cover sleeve 131 (see Fig. 3). Supposing that the observer sights an enemy's vessel. All vessels of this class are provided with catalogues or registers of all known battleships with their approximate dimensions and the observer is at once informed of the name of the ship sighted. He then looks up the length of it in his register and sets the wires 60 and 61 at a distance apart on scales 68 and 65 exactly corresponding to the length of such a ship. He then rotates the entire instrument until the vessel is fairly in view, and slowly turns the handle 36 varying the magnification until the image of the ship is exactly included within the wires 60 and 61, constantly keeping the image between the two wires by moving the knurled head 57, and by looking at the scale 71 on the revoluble sleeve 131, he can read off the range or the ship from his instrument. If the ship should be so far away that its image will not fit within the distance between the wires 60 and 61 at the maximum magnification of which the instrument is capable, then these wires may be adjusted to a fraction of the ship's dimensions, for instance, twice its length. After so doing, the observer can proceed as before and read the range as indicated, ascertaining the actual range by multiplying his reading by two. In the same way a similar method can be employed in ascertaining the range of an object so near that its image will extend beyond the wires 60 and 61. In that case they may be set at say one-half the ship's length and the range as read be divided by 2.

What I claim is:

1. The combination with an optical instrument having means for varying the magnification of an object viewed therethrough, of mechanism coöperating with said means and dependent on the actuation thereof in varying the magnification of an object of predetermined size, for approximately indicating the distance of such object.

2. An optical instrument comprising a reducing telescope, an expanding telescope, means for varying the magnification of each telescope including a movable member within reach of the observer, a device for indicating the ascertained size of an image of the object viewed through the instrument as projected on the field of vision, and means for reading the range of the object so viewed consisting of a scale arranged near to the movable member.

3. An optical instrument comprising a reducing telescope an expanding telescope, means for varying the magnification of each telescope including a movable member within reach of the observer, a device for indicating the ascertained size of an image of the object viewed through the instrument as projected on the field of vision, and means for reading the range of the object so viewed consisting of a scale arranged near to the movable member of either telescope.

4. An optical instrument comprising a reducing telescope, an expanding telescope, means for varying the magnification of each telescope including a movable member within reach of the observer, a device for indicating the ascertained size of an image of the object viewed through the instrument as projected on the field of vision, and means for reading the range of the object so viewed consisting of a scale arranged near to the movable member whereby as the magnification is varied to cause the image of the object to coincide with the indication of its size, the extent of such variation is ascertained in terms of distance of the object from the observer.

5. In an instrument of the character described, a device arranged at its eye piece end comprising a frame adapted to carry two wires for measuring an object in the field of vision, means for moving the wires with respect to each other, and means for bodily moving the frame while maintaining the wires in fixed relation.

6. In an instrument of the character described, a telescope including an eye piece, a frame movable transversely of the eye piece, and measuring elements carried by the frame and relatively adjustable thereon, said elements being movable with the frame while maintaining a fixed relation.

7. In an instrument of the character described, a telescope including an eye piece, a frame movable transversely of the eye piece, means for moving the frame, including an actuating device disposed externally of the telescope, relatively adjustable measuring elements mounted on the frame and movable therewith while maintaining a fixed relation, and means for relatively adjusting the elements on the frame, including an actuating device disposed externally of the telescope.

8. The combination with an optical instrument having a variable power of a device arranged at the eye piece focus for measuring the extent of the image of an object viewed through the instrument.

9. The combination with an optical instrument having a variable power of a device arranged at the eye piece focus for measuring the extent of the image of an object viewed through the instrument in combination with means for ascertaining the extent of the variation of the power, read in terms of lineal distance.

10. The combination with an optical instrument having a variable power of a device arranged at the eye piece focus for measuring the extent of the image of an object viewed through the instrument, means for maintaining a register of said extent in the field of vision during the observation.

11. The combination with an optical instrument having a variable power of a device arranged at the eye piece focus for measuring the extent of the image of an object viewed through the instrument, means for maintaining a register of said extent in the field of vision during the observation, and which register is adapted to remain constant during any variation in the power.

12. The combination with an optical instrument having a variable power of a device arranged at the eye piece focus for indicating the dimensions of the image of an object viewed through the instrument at a predetermined magnification.

13. The combination with an optical instrument having a variable power of a device arranged at the eye piece focus for indicating the dimensions of the image of an object viewed through the instrument at a predetermined magnification, and means for varying the magnification to cause the actual image of the object to coincide with its indicated size.

14. The combination with an optical instrument having a variable power of a device arranged at the eye piece focus for indicating the dimensions of the image of an object viewed through the instrument at a predetermined magnification, means for varying the magnification to cause the actual image of the object to coincide with its indicated size, and means for measuring the extent of such variation in the magnification.

15. The combination with an optical instrument having a variable power of a device arranged at the eye piece focus for indicating the dimensions of the image of an object viewed through the instrument at a predetermined magnification, means for varying the magnification to cause the actual image of the object to coincide with its indicated size, and means for measuring the extent of such variation in the magnification in terms of lineal distance of the object viewed from the instrument.

16. The combination with an optical instrument having a variable power of a device arranged at the eye piece focus for indicating the dimensions of the image of an object viewed through the instrument at a predetermined magnification, means for varying the magnification to cause the actual image of the object to coincide with its indicated size, and means for measuring the extent of such variation in the magnification in terms of lineal distance of the object viewed from the instrument, and means for varying such indication to indicate fractions of the original image.

17. The combination with an optical instrument having a variable power of a device arranged at the eye piece focus for indicating the dimensions of the image of an object viewed through the instrument at a predetermined magnification, means for varying the magnification to cause the actual image of the object to coincide with its indicated size, and means for measuring the extent of such variation in the magnification in terms of lineal distance of the object viewed from the instrument, and means for varying such indication to indicate fractions of the original one, means for varying the magnification being also adapted to cause the actual image of the object to be brought to a position to compare it with the indication.

18. The combination with an optical instrument having a variable power of a device arranged at the eye piece focus for indicating the dimensions of the image of an object viewed through the instrument at a predetermined magnification, means for varying the magnification to cause the actual image of the object to coincide with its indicated size, and means for measuring the extent of such variation in the magnification in terms of lineal distance of the object viewed from the instrument, and means for varying such indication to measure multiples of the original one, and means for varying the magnification to cause the actual image of the object to be brought to a position to compare it with the indication, and means for measuring the extent of the variation in terms of lineal distance.

19. The combination with an optical instrument having means for varying the magnification of an object viewed therethrough, of means for indicating the magnification of an object of predetermined size at a predetermined distance, and means dependent on the relative movement of the magnification-varying means and indicating means for indicating the approximate distance between such object and the instrument when located at another than said predetermined distance.

In testimony whereof I affix my signature in presence of two witnesses.

FREDERICK L. G. KOLLMORGEN.

Witnesses:
 CLARENCE G. CAMPBELL,
 MARY H. LEWIS.